Dec. 18, 1923.
R. K. CLARK ET AL
1,478,364
UNWINDER FOR SPOOLS
Filed July 3, 1922
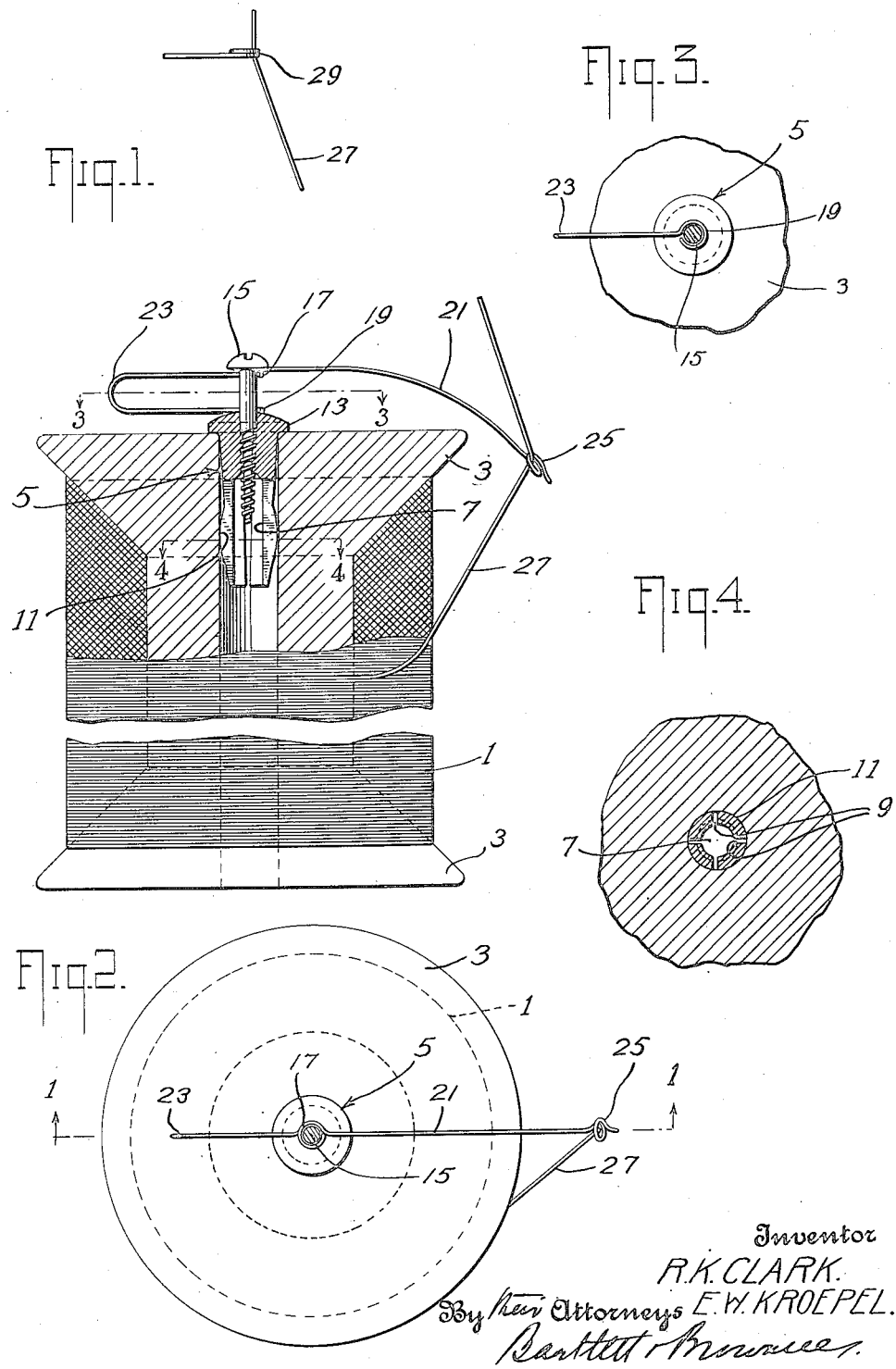
Inventor
R. K. CLARK.
E. W. KROEPEL.
By their Attorneys
Bartlett Patented Dec. 18, 1923.

1,478,364

UNITED STATES PATENT OFFICE.

ROBERT K. CLARK, OF SPRINGFIELD, AND EMIL W. KROEPEL, OF HOLYOKE, MASSACHUSETTS, ASSIGNORS TO THE AMERICAN THREAD COMPANY, OF JERSEY CITY, NEW JERSEY, A CORPORATION OF NEW JERSEY.

UNWINDER FOR SPOOLS.

Application filed July 3, 1922. Serial No. 572,673.

*To all whom it may concern:*

Be it known that we, ROBERT K. CLARK and EMIL W. KROEPEL, citizens of the United States, residing at Springfield and Holyoke, county of Hampden, State of Massachusetts, have invented a certain new and useful Improvement in Unwinders for Spools, of which the following is a full, clear, and exact description.

Our invention relates to unwinders for spools and has for its object to provide a new and durable unwinder which will adapt itself to various sizes of holes in spools; also an unwinder in which the drag or tension can be easily and positively adjusted; also an unwinder in which the location of the eye with respect to the top head of the spool will be positively determined; also an unwinder which shall be inexpensive to manufacture.

The following is a description of an embodiment of our invention reference being had to the accompanying drawings, in which, Fig. 1 shows a vertical section through the unwinder on the line 1—1, Fig. 2 and a portion of a spool in the upper end of which the unwinder is inserted;

Fig. 2 is a plan view with the head of the adjusting screw removed;

Fig. 3 is a section on the line 3—3, Fig. 1; and

Fig. 4 is a section on the line 4—4, Fig. 1.

Referring more particularly to the drawings, 1 is a spool having upper and lower heads 3. 5 is a plug preferably of wood having in its lower end a bore 7. The lower end of this plug is provided with cross-cuts 9 extending half way up the plug so as to make the lower end resilient. The lower end of the plug is also provided with a swelled portion 11 adapted to engage the inner surface of the hole in the spool. The plug is also provided with a flange 13 which when the plug is fully inserted engages the top surface of the head of the spool so as to definitely fix the location of the plug. 15 is a screw which fits within a hole passing downward through the top of the plug and constitutes a longitudinally movable adjusting device. This screw passes through two loops 17 and 19 in a flier 21, the two loops being connected by a spring portion 23. The flier is made of spring wire and is provided with a helical thread guide 25. 27 is a thread leading from the spool through the guide 25 to a guide 29 located above the spool. When the upper end of the thread is pulled the thread unwinds from the spool, the flier 21 revolving and feeding the thread off so as to clear the head 3. The screw 15 puts a tension upon the flier 21 by reason of the frictional contact of the loop 17 with the head of the screw and the loop 19 with the top of the plug. This tension can be increased by screwing the screw further in and reduced by unscrewing the screw as desired.

The device is simple in construction and inexpensive to manufacture and on account of its positive action and definite location in the spool gives uniform good results, while its longitudinal adjustable screw enables its tension to be adapted for the requirements of varying conditions.

As will be evident to those skilled in the art, our invention permits of various modifications without departing from the spirit thereof or the scope of the appended claims.

What we claim is:

1. In an unwinder for spools the combination of a plug having an axial hole and adapted to enter the hole in a spool end, a headed member located within the hole in said plug and longitudinally adjustable therein, a flier carried by said member, the tension of said flier being adjustable by the longitudinal movement of said member relatively to said plug.

2. In an unwinder for spools the combination of a plug having an axial hole and adapted to enter the hole in a spool end, a headed member located within the hole in said plug and longitudinally adjustable therein, a flier carried by said member, said flier having two portions spaced apart from one another and embracing said member, and a connecting U-shaped spring portion located out of alinement with the axis of said member; so that the tension of said flier is adjustable by the longitudinal movement of said member relatively to said plug.

3. In an unwinder for spools the combination of a plug having an axial hole and adapted to enter the hole in a spool end, a headed member located within the hole in said plug and longitudinally adjustable therein, a flier carried by said member, the tension of said flier being adjustable by the longitudinal movement of said member relatively to said plug, said plug having a shoulder adjacent to its upper end adapted to engage the upper surface of a spool head and having a radially slotted lower portion enlarged adjacent to its lower end, said lower end having a bore of larger diameter than the shank of said headed member and surrounding the lower end of said shank.

4. In an unwinder for spools the combination of a plug adapted to enter the hole in a spool end, a headed screw-threaded member in said plug, a flier carried by said member said flier having two portions spaced apart from one another and embracing said member, said two portions being connected by a spring portion of said flier, so that the tension of said flier is adjustable by the turning of said screw-threaded member and resulting longitudinal movement of said member relatively to said plug.

ROBERT K. CLARK.
EMIL W. KROEPEL.